United States Patent [19]

Kitamura

[11] Patent Number: 4,476,474

[45] Date of Patent: Oct. 9, 1984

[54] DOT RECORDING APPARATUS

[75] Inventor: Takashi Kitamura, Yokohama, Japan

[73] Assignee: Canon Kabushiki Kaisha, Tokyo, Japan

[21] Appl. No.: 360,687

[22] Filed: Mar. 22, 1982

[30] Foreign Application Priority Data

Apr. 2, 1981 [JP] Japan .................................. 56-50362
Apr. 20, 1981 [JP] Japan .................................. 56-60451

[51] Int. Cl.³ .......................................... G01D 15/14
[52] U.S. Cl. .................................. 346/160; 346/107 R
[58] Field of Search ................. 346/76 L, 107 R, 108, 346/153.1, 154, 160; 354/5; 358/296, 298–300

[56] References Cited

U.S. PATENT DOCUMENTS 4,015,221 3/1977 Dalton ............................ 346/108 X
4,060,323 11/1977 Hirayama et al. ................. 346/76 L
4,107,687 8/1978 Pfeifer et al. .................... 346/107 R
4,151,563 4/1979 Gast et al. ............................ 358/298

Primary Examiner—Thomas H. Tarcza
Attorney, Agent, or Firm—Fitzpatrick, Cella, Harper & Scinto

[57] ABSTRACT

A dot recording apparatus has a semiconductor light source array having two light sources for emitting light beams for forming dots of different diameters. Both light sources can be driven simultaneously, or only one light source can be driven. A laser driver circuit can be driven according to the on/off operation of a switch. The on/off operation of the switch can be performed manually or in accordance with operation of an automatic control circuit. Narrowing of thin lines in the main scanning direction or in the subscanning direction can be prevented. An image of good resolution can be formed even if the scanning line pitch is increased.

12 Claims, 15 Drawing Figures

FIG. 9
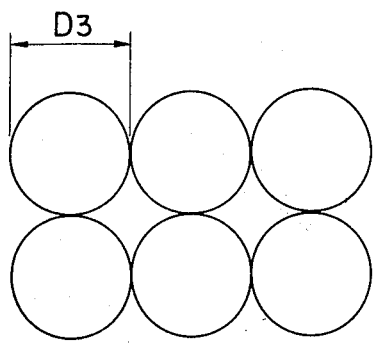
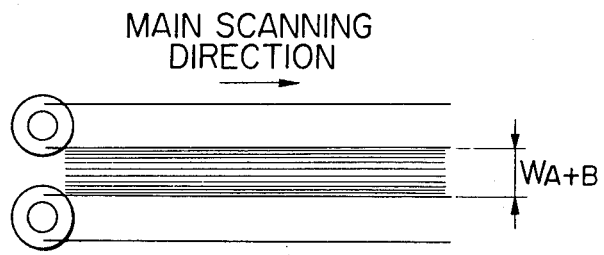
FIG. 11A
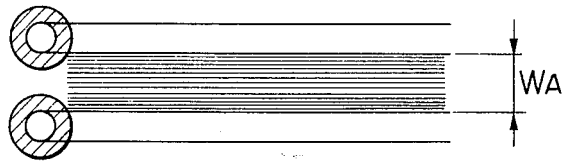
FIG. 11B
FIG. 13
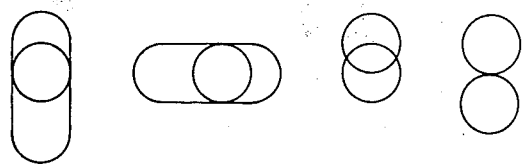

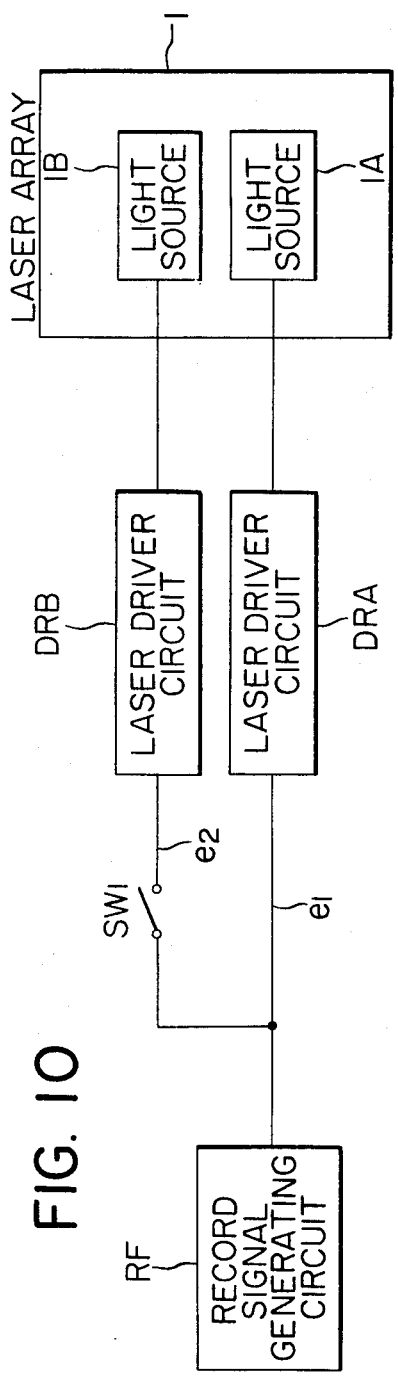

DOT RECORDING APPARATUS

BACKGROUND OF THE INVENTION

1. Field of the Invention

The present invention relates to a recording apparatus for recording an image with dots on a recording medium.

2. Description of the Prior Art

Conventionally, when there is a need to shorten the transfer time of image signals during image formation in facsimiles and the like, the pitch of the scanning lines is increased. For this reason, the number of picture elements is small, the density is low and the quality of the image obtained is not satisfactory.

In order to improve the density, the same image signals are sometimes written in two lines. However, this does not shorten the recording time.

In the method for radiating a photosensitive body with a light beam and for visualizing a portion of the photosensitive body which is not radiated with the light beam (the unexposed part), "narrowing of the image" (narrowing of the image in the main scanning direction of the beam) occurs more than in the case of the method for visualizing a portion of the photosensitive body which is radiated with the light beam (the exposed part). This will be described in the further detail, with reference to a letter "T". In the method for visualizing the part radiated with the light beam, a letter "T" is formed as shown in FIG. 1, which has widths 101 and 102 in the main scanning direction. In contrast to this, in the method for visualizing the unexposed part, a letter "T" is formed as shown in FIG. 2, which has widths 201 and 202 in the scanning direction which are smaller than widths 101 and 102. This is called "narrowing of the image". Due to this phenomenon, the quality of the recorded letter "T" it not satisfactory in the method for visualizing the unexposed part. The reason for this phenomenon will be described with reference to FIG. 3A. In the method for visualizing the exposed part, in order to draw a line segment, a scanning spot at location 312 is formed on the recording medium at a leading edge 310 of an image signal 300. The scanning spot moves in a scanning direction 314 while the image signal 310 is on. The scanning spot at location 313 goes off at a trailing edge 311 of the image signal 300. In an exposure distribution 302 at a central line 315 of the scanning spot of the line segment, the light exposure increases from an end 316 to an end 318 of the scanning spot at location 312, remains constant for a time thereafter, and decreases from an end 319 to an end 321 of the scanning spot at location 313. The light exposure decreases to ½ the peak value at centers 317 and 320 of the scanning spot at locations 312 and 313. In the method for visualizing the exposed part, the part exposed at a level above a visualizing level 322 in the exposure distribution 302 is visualized while the part exposed at a level below the visualizing level 322 is not visualized. Therefore, the width of the visualized image becomes 323. The width 323 corresponds to the widths 101 and 102. In the method for visualizing the unexposed part, an image is formed with an image signal 304 which is an inverted signal of the image signal 300. The scanning spot at location 352 is on until a trailing edge 350 of the image signal 304 is generated and then the scanning spot goes off. At a leading edge 351 of the image signal 304, a scanning spot at location 353 is formed which moves in a scanning direction 354. In an exposure distribution 306 at a central line 355 of the scanning spot of the line segment, the light exposure decreases from an end 356 to and end 358 of the scanning spot 352 and then becomes zero. The exposure distribution 306 remains zero thereafter, increases from an end 359 to an end 361 of the scanning spot at location 353, and then remains constant again. The light exposure decreases to ½ the peak value at centers 357 and 360 of the scanning spot at locations 352 and 353. If a visualizing level in the method for visualizing the unexposed part is 362, the exposed and unexposed parts which are at levels above the level 362 are visualized and the remaining parts are not visualized. Therefore, the width of the visualized image becomes 363. This width corresponds to widths 201 and 202 in FIG. 2.

As has been described above, in the method for the unexposed part, the visualized width becomes 363 shown in FIG. 3B (or 201 and 202 in FIG. 2). This visualized part is more narrow than the visualized width 323 shown in FIG. 3A (or 101 or 102 in FIG. 1) produced according to the method for visualizing the exposed part. Therefore, the letter "T" as shown in FIG. 1 is recorded as a letter "T" as shown in FIG. 2. When such narrowing occurs, the quality of the image is thus degraded.

Narrowing does not present a big problem if a thick line is to be recorded since narrowing only occurs at the edges of the image in this case. However, in the case of a thin line, narrowing becomes noticeable. In order to solve this problem, Japanese Patent Application No. 8,112/81 proposes a method according to which the pulse width of the electric signal is increased in the main scanning direction so as to compensate for narrowing of the image. However, this prior art method does not provide a good solution to the problem of narrowing in the subscanning direction.

SUMMARY OF THE INVENTION

It is an object of the present invention to provide a recording apparatus which solves the problems of prior art recording apparatus described above.

It is another object of the present invention to provide a recording apparatus wherein the image quality is not degraded even if the scanning line pitch is increased.

It is still another object of the present invention to provide a recording apparatus which is simple in construction and which is capable of recording images of good quality.

It is still another object of the present invention to provide a recording apparatus wherein narrowing of an image is eliminated.

It is still another object of the present invention to provide a recording apparatus which is suitable for practicing a method for visualizing a part of an image which is not exposed to the light beam.

It is still another object of the present invention to provide an image recording apparatus which is capable of recording input recording signals with reliability.

BRIEF DESCRIPTION OF THE DRAWINGS

FIG. 9 is a view showing still another recording pattern when both light sources 1A and 1B are used;

FIG. 10 is a block diagram of a control circuit of the recording apparatus shown in FIG. 4;

FIGS. 11A and 11B are views showing an example of images formed;

FIG. 12 is a block diagram of a driver circuit of a laser light source; and

FIG. 13 is a view showing examples of superposition of light beams.

DETAILED DESCRIPTION OF THE PREFERRED EMBODIMENTS

Figure 1:
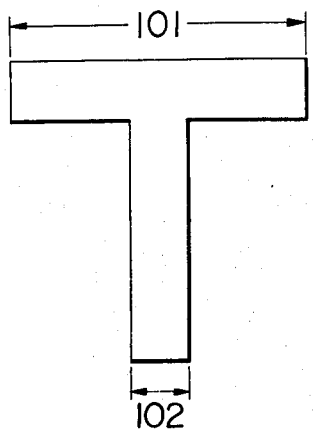
FIGS. 1, 2, 3A and 3B are views for explaining narrowing of an image.
Figure 2:
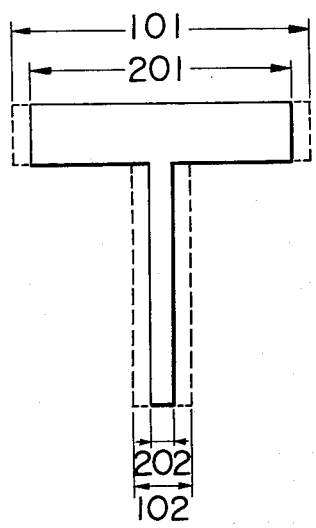
Figure 3A:
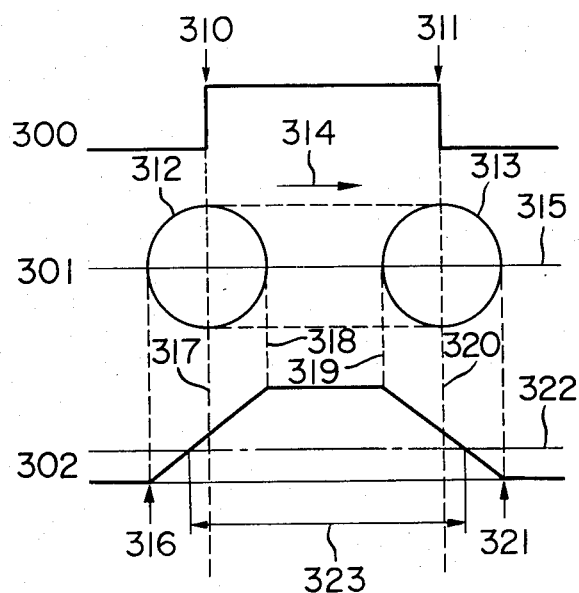
Figure 3B:
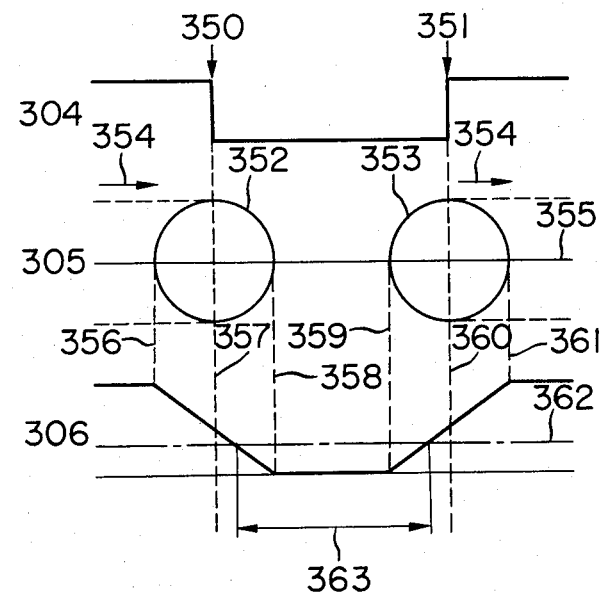
Figure 4:
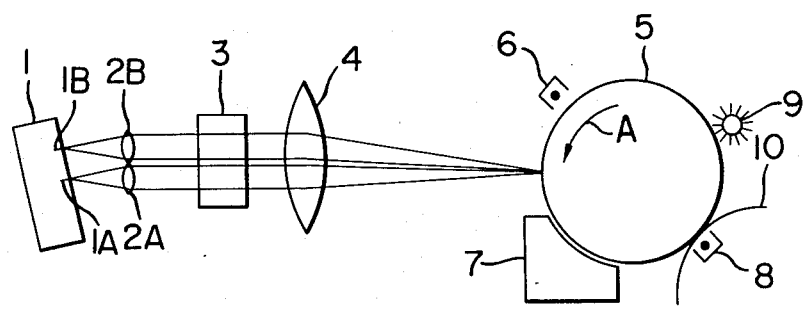
FIG. 4 is a schematic sectional view of a recording apparatus according to an embodiment of the present invention.

The preferred embodiment of the present invention will now be described with reference to the accompanying drawings. FIG 4 is a schematic sectional view of a recording apparatus according to an embodiment of the present invention. A laser array 1 has a plurality of laser light sources on a single base.

A photosensitive drum 5 rotates in the direction indicated by arrow A. After the surface of the photosensitive drum 5 is uniformly sensitized by a sensitizer 6, parts of the surface which are radiated with the light beams from the laser array 1 are charge-removed. Thus, an electrostatic latent image is formed.

The electrostatic latent image is visualized by a developing unit 7 and is then transferred onto a transfer paper sheet 10 by a transfer charger 8. The surface of the photosensitive drum 5 is then cleaned by a cleaner 9.

Assume that the laser array 1 is arranged so that a light source 1A of the laser array 1 is located at the focal point of a collimator lens 2A.

Figure 5:
FIG. 5 is a view showing a scanning spot obtained with the recording apparatus shown in FIG. 4.

A light source 1B is arranged to be positioned away from the focal point of a collimator lens 2B. The collimator lenses 2A and 2B for converting the light beams from the light sources 1A and 1B into parallel beams are arranged to be parallel to an imaging lens 4. A single lens may be used in place of the collimator lenses 2A and 2B. It suffices that a line connecting the light sources 1A and 1B may not be perpendicular to the optical axis of the collimator lens or lenses. The light beams emitted by the light sources 1A and 1B are deflected by a scanning mirror 3 and form scanning spots SA and SB, respectively, as shown in FIG. 5, at imaging positions of the photosensitive drum 5.

Figure 6:
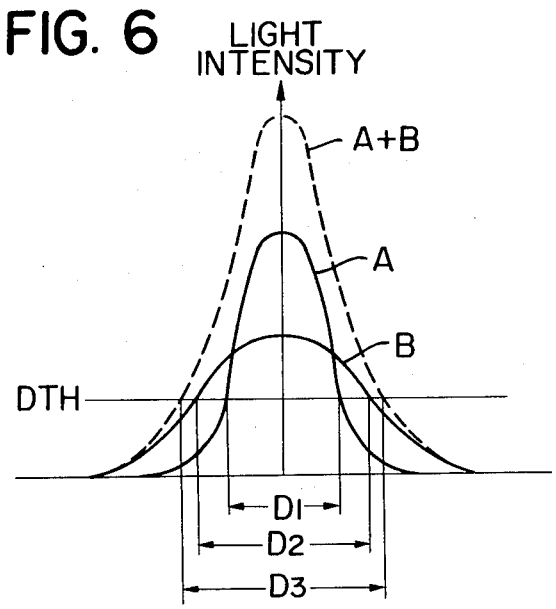
FIG. 6 is a graph showing the light intensity distribution of the spot formed by the recording apparatus shown in FIG. 4.

FIG. 6 shows the light intensity distribution of the scanning spots. Referring to FIG. 6, curves A and B represent the light intensity distributions of the scanning spots SA and SB while a curve A+B represents the sum of these two light intensity distributions. As may be seen from this graph, when both light sources 1A and 1B of the laser array 1 are lit, the scanning spot has a diameter $D_3$ at the developing level of the developing unit 7. When only the light source 1A is lit, the diameter of the scanning spot becomes $D_1$ (where $D_3 > D_1$).

Figure 7:
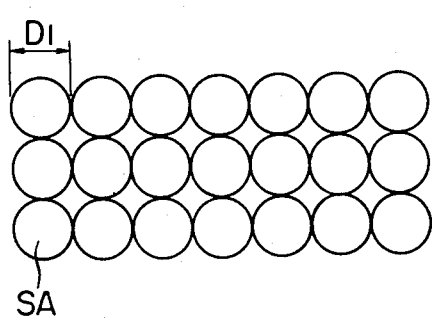
FIG. 7 is a view showing a fine recording pattern when a light source 1A is used.

In order to perform high-density recording, the light source 1A is used to obtain a scanning spot of diameter $D_1$ as shown in FIG. 7. In this case, a fine pattern can be recorded.

Figure 8:
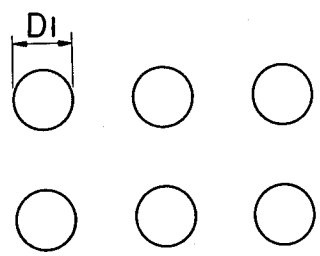
FIG. 8 is a view showing another recording pattern with an increased picture element pitch when the light source 1A is used.

When high-speed recording is performed with only the light source 1A by eliminating some image signals, that is, by increasing the pitch of the scanning lines, the pitch of the picture elements increases as shown in FIG. 8. Then, an image of low density is formed.

In order to solve this problem, when the pitch of the scanning lines is great, both light sources are lit. Then, an image of high density as shown in FIG. 9 is obtained.

Therefore, a solid black image without white streaks may be obtained.

FIG. 10 is a block diagram of a control circuit of a recording apparatus according to an embodiment of the present invention. A recording signal generated by a recording signal generating circuit RF is applied to a laser driver circuit DRA through a line e1. The laser driver circuit DRA then produces an output which drives the light source 1A on the laser array 1. The recording signal on the line 1 is also applied to a laser driver circuit DRB through a switch SW1 in the line e2. The output from the laser driver circuit DRB drives the light source 1B on the laser array 1.

With the recording apparatus of the configuration as described above, when the switch SW1 is off, the light source 1A alone is driven in response to the recording signal. On the other hand, when the switch SW1 is on, both the light sources 1A and 1B are driven in response to the recording signal. Therefore, in order to record an image with a small pitch of picture elements, as shown in FIG. 7, the switch SW1 is turned off. However, in order to record an image with a large pitch of the picture elements, as shown in FIG. 9, the switch SW1 is turned on.

The on/off operation of the switch SW1 may be performed manually. Alternatively, the on/off operation of the switch SW1 may be automatically performed in response to a density signal.

Another embodiment of the present invention, for example, a recording apparatus for visualizing a part of the photosensitive body which is not radiated with a light beam, will now be described. In this case, the apparatus may be the one shown in FIG. 4; the polarity of the toner, however, must be reversed. Therefore, please refer to FIG. 4 for details of the apparatus.

As is apparent from FIG. 6, when both the light sources 1A and 1B are lit, the diameter of the scanning spot becomes $D_3$ at a developing level DTH. When only the light source 1A is lit, the diameter of the imaging spot becomes $D_1$ where $D_3 > D_1$. When the photosensitive body is radiated with these light beams and is developed, images as shown in FIG. 11 are formed.

FIG. 11A shows an image formed when both the light sources 1A and 1B are lit, whereas FIG. 11B shows an image formed when only the light source 1A is lit. As can be seen from FIG. 11, when the light source 1B is not lit, thick lines of a greater total width which extend parallel to each other in the main scanning direction are formed.

FIG. 12 shows a block diagram of a detecting circuit for detecting separate lines parallel in the main scanning direction and separate dots, and a driver circuit including driven transistors TRA and TRB for driving the light sources 1A and 1B.

To an image signal input terminal T1 are supplied an image signal of high level (to be referred to as "H" for brevity hereinafter) at an image part and an image signal of low level (to be referred to as "L" for brevity hereinafter) at a non-image part.

Shift registers SF1 to SF3 respectively store image signals for one scanning line. If it is assumed that data of the n-th line is stored in the shift register SF1, data of the (n+1)th line is stored in the shift register SF2, and data of the (n+2)th line is stored in the shift register SF3.

There are eight combinations of the data at the same main scanning positions of three lines. During recording of the n-th line, the light sources 1A and 1B are selected in the manner as shown below according to the combinations of the data:

|     | 1   | 2   | 3   | 4   | 5   | 6   | 7   | 8   |
| --- | --- | --- | --- | --- | --- | --- | --- | --- |
| n+2 | L   | L   | L   | L   | H   | H   | H   | H   |
| n+1 | L   | L   | H   | H   | L   | L   | H   | H   |
| n   | L   | H   | L   | H   | L   | H   | L   | H   |
| 1A  | ON  | OFF | ON  | OFF | ON  | OFF | ON  | OFF |
| 1B  | ON  | OFF | OFF | OFF | ON  | OFF | ON  | OFF |

Describing data of the n-th line as an example, when the data of the n-th line is "H", both the light sources 1A and 1B are off. When the data of the n-th line is "L", only the light source 1A is lit if the data of the (n+1)th line is "H" and the data of the (n+2)th line is "L". In other cases, both the light sources 1A and 1B are lit. In this manner, the diameter of the light beam can be decreased only when an image is separated from other image parts. Therefore, separate thin lines may be thickened in the subscanning direction.

The above embodiment has been described with reference to a case wherein the image is separated from other image parts by one dot and must be thickened. However, an image which is separated from other image parts by 2 to 5 dots may be thickened by increasing the number of line buffers such as the shift registers as described above.

The above description has been made with respect to a case for thickening lines in the subscanning direction. However, lines may be thickened in the main scanning direction in a similar manner.

In the embodiments described above, one of the laser arrays is defocused for the purpose of increasing the area of one picture element. However, there are other ways to achieve the same effects. An example will be described below.

The spot diameter and the length of the optical path of the laser beam substantially hold the relation below:

$$\text{Spot diameter} = (f_2/f_1) \times \text{optical path length} + 2.44 \times \lambda \times F$$

where
$f_1$ is the focal length of the collimator lens;
$f_2$ is the focal length of the imaging lens;
$\lambda$ is the wavelength; and
$F$ is the numerical aperture.

As may be seen from the above relation, the greater the optical path length, the greater the spot diameter. Therefore, if the optical path length of the laser array is varied, the spot diameter may be varied without requiring slanting of the laser array with respect to the optical axis.

Alternatively, similar effects may also be obtained by changing the converging angle of the laser array since this affects F.

In the embodiments described above, the spot diameter is varied. However, similar effects may be obtained even with a spot of one diameter. Furthermore, similar effects may be obtained if the spots partially overlap each other (the light intensity at the overlapping part must equal or be above the developing level) as shown in FIG. 13 even if the spots do not overlap completely.

Furthermore, similar effects may also be obtained if a laser of large spot diameter and a laser of small spot diameter are operated independently of each other.

In summary, in recording of images of small areas such as thin lines, narrowing of the lines may be improved according to the present invention as compared with the case of recording with a light beam of smaller spot diameter. Improved image quality may thus be obtained.

Since the laser array needs to produce a smaller output due to superposition, the service life of the lasers is prolonged and the reliability of the system is improved.

What I claim is:

1. A dot recording apparatus for recording dots on a dot forming member, comprising:
    first dot forming means for forming a first dot on the dot forming member;
    second dot forming means for forming a second dot, on the dot forming member, which is smaller in size than the first dot formed by said first dot forming means, said second dot forming means being driveable independently of said first dot forming means; and
    driving means for driving both said first dot forming means and said second dot forming means to form the first and second dots concentrically on said dot forming member.

2. An apparatus according to claim 1, wherein said first dot forming means and said second dot forming means include light beam forming means.

3. An apparatus according to claim 1, further comprising selecting means for selectively causing said driving means to drive said first dot forming means and said second dot forming means.

4. An apparatus according to claim 1, wherein the dot forming member comprises a photosensitive body which is sensitive to light irradiation.

5. A dot recording apparatus for recording a dot image, comprising:
    a dot forming member on which dots may be recorded to form the dot image;
    dot forming means for forming one of a first dot and a second dot which is different in size from the first dot on said dot forming member; and
    selecting means for selectively causing said dot forming means to form one of the first dot and the second dot on said dot forming member on the basis of the degree of separation of dots in the dot image.

6. An apparatus according to claim 5, wherein said dot forming means includes light beam forming means for forming a light beam so as to form the first and second dots.

7. An apparatus according to claim 5, wherein said selecting means comprises a switch.

8. An apparatus according to claim 5, wherein said dot forming means comprises first light beam emitting means for emitting a first light beam, and second light beam emitting means for emitting a second light beam, the first light beam forming the first dot and the second light beam forming the second dot.

9. A dot recording apparatus for forming dots comprising:
    a photosensitive body which is sensitive to light irradiation;

an array of semiconductor light sources including a plurality of light sources for emitting a plurality of lights for irradiating said photosensitive body;

scanning means for simultaneously scanning, relative to the photosensitive body, the plurality of lights emitted by said array of semiconductor light sources;

optical means for simultaneously receiving the plurality of lights scanned by said scanning means to form a dot from said lights on said photosensitive body, and means for varying the relative image focusing conditions under which each of the plurality of lights is formed by said optical means on said photosensitive body to obtain different size of dots from each of said lights.

10. An apparatus according to claim 9, further comprising collimating means for collimating the plurality of lights emitted by said array of semiconductor light sources so as to input the collimated lights to said optical means.

11. A dot recording apparatus for forming dots on a photosensitive body, comprising:

a semiconductor light source array including a plurality of light sources for emitting a plurality of lights for radiating the photosensitive body;

first optical means for making parallel the plurality of lights emitted by said semiconductor light source array, said semiconductor light source array and said first optical means being arranged so that distances traveled therebetween by each of the lights emitted by said light sources are different; and second optical means for converging the plurality of lights made parallel by said first optical means on said photosensitive body, whereby different focusing conditions for dots formed from said lights on said photosensitive body are obtained.

12. An apparatus according to claim 11, further comprising scanning means for scanning, relative to said photosensitive body, the plurality of lights made parallel by said first optical means.

* * * * *